United States Patent [19]
Morgan et al.

[11] Patent Number: 6,073,140
[45] Date of Patent: Jun. 6, 2000

[54] METHOD AND SYSTEM FOR THE CREATION, ENHANCEMENT AND UPDATE OF REMOTE DATA USING PERSISTENT KEYS

[75] Inventors: Charles D. Morgan, Little Rock; G. Leigh McLaughlin, Conway; Marvin G. Fogata, Little Rock; Joy L. Baker, Searcy; Joy E. Cook, Little Rock; James E. Mooney; David B. Roland, both of Conway; John R. Talburt, Little Rock, all of Ark.

[73] Assignee: Acxiom Corporation, Little Rock, Ak.

[21] Appl. No.: 08/902,567

[22] Filed: Jul. 29, 1997

[51] Int. Cl.[7] .................................................. G06F 17/30
[52] U.S. Cl. .............................. 707/203; 707/3; 707/8; 707/201
[58] Field of Search ................... 707/2, 4, 5, 10, 707/103, 203, 3, 8, 201; 395/11, 227, 705; 345/355

[56] References Cited

U.S. PATENT DOCUMENTS

| | | | |
|---|---|---|---|
| 4,528,643 | 7/1985 | Freeny, Jr. | 364/918 |
| 4,933,848 | 6/1990 | Haderle et al. | 707/201 |
| 5,291,583 | 3/1994 | Bapat | 395/705 |
| 5,495,609 | 2/1996 | Scott | 707/8 |
| 5,530,854 | 6/1996 | Emery et al. | 707/100 |
| 5,603,025 | 2/1997 | Tabb et al. | 707/2 |
| 5,692,132 | 11/1997 | Hogan | 395/227 |
| 5,706,495 | 1/1998 | Chadha et al. | 707/2 |
| 5,765,028 | 6/1998 | Gladden | 395/11 |
| 5,767,854 | 6/1998 | Anwar | 345/355 |
| 5,794,229 | 8/1998 | French et al. | 707/2 |
| 5,799,300 | 8/1998 | Agrawal et al. | 707/5 |
| 5,870,753 | 2/1999 | Chang et al. | 707/103 |
| 5,890,154 | 3/1999 | Hsiao et al. | 707/8 |
| 5,943,668 | 8/1999 | Malloy et al. | 707/3 |

OTHER PUBLICATIONS

Draft U.S. Patent application of Greco, et al. for "Method" Apparatus for Controlling an Electronic Data Warehouse (no date).

"Red Brick Systems Unveils Data Mining Strategy: Planst to Provide Data Warehousing, Data Mining Capabilities in Single, Integrated RDBMS Engine", PR Newswire, pp. 610SJM002, Jun. 1996.

"Maximizing Your Warehouse", InformationWeek, pp. 42, Mar. 1996.

*Primary Examiner*—Thomas G. Black
*Assistant Examiner*—Charles L. Rones
*Attorney, Agent, or Firm*—J. Charles Dougherty

[57] ABSTRACT

A method and system for the creation, enhancement and update of data on a customer database using data from a central database and persistent keys that are linked to each data structure is disclosed. The persistent keys allow the matching of equivalent data structures between the remote and central databases so that enhancement data from the central database can be overlaid onto the customer database. The persistent keys also make the update of data on the customer database more efficient, since key matching allows the transfer of only the data that is needed to update the customer database. The central database may physically contain all of the enhancement data, or may use a central database manager to transparently link a group of physically remote databases using the persistent keys. Data may be transferred from the central database to the customer database either in batch mode or in a near real-time mode through a direct table join. The linking feature of the persistent keys further allows the linkage of the customer database and the central database to create a multidimensional database.

55 Claims, 5 Drawing Sheets

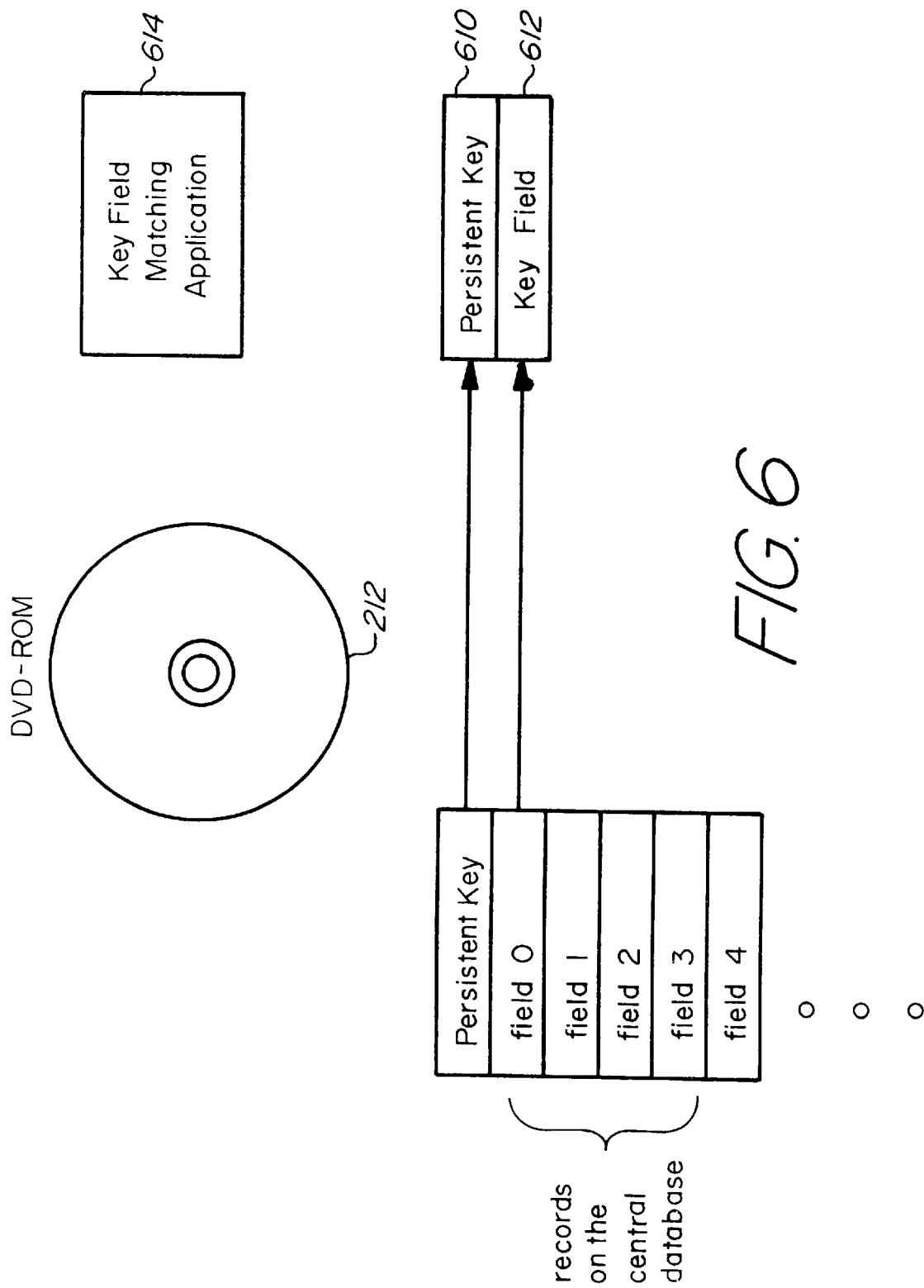

METHOD AND SYSTEM FOR THE CREATION, ENHANCEMENT AND UPDATE OF REMOTE DATA USING PERSISTENT KEYS

BACKGROUND OF THE INVENTION

The present invention is directed to a method and system for the creation, enhancement and update of data on a customer database using data from a central database and persistent keys that are linked to each data structure. These persistent keys allow the matching of equivalent data structures between the remote and central databases so that enhancement data from the central database can be overlaid onto the customer database. The persistent keys also make the update of data on the customer database more efficient, since key matching allows the transfer of only the data that is needed to update the customer database. The central database may physically contain all of the enhancement data, or may use a central database manager to transparently link a group of physically remote databases, such that a virtual central database is created containing data from all of the linked databases. The linking feature of the persistent keys allows the central database manager to transparently link the various physically remote databases so that they appear as a unified central database to the customer database operator requesting data enhancement.

The high cost of mass-market advertising has increasingly led many retailers to seek more specific ways to target their advertising to those persons most likely to purchase their products or services. A popular method of directed advertising is to develop a database of prospective customers defined by specific criteria such as age, marital status, geographic region and income. Using such a database, retailers can create a "mailing list" to accurately target mailings to only those persons most likely to respond, thereby gaining the largest return on their advertising expenditures.

A number of companies now offer services such as those described above. These companies (which will be referred to as "data vendors") either maintain or have access to enormous amounts of data pertaining to individuals, businesses and other entities. Drawing on such resources, a data vendor can tailor a mailing list to fit a particular retailer's specific needs. A data vendor's services can be as simple as building a database with the names and addresses of all individuals living in a particular geographic region. Data vendors can also build databases using complex household demographic data as the criteria for inclusion in the database. In addition, data vendors can "enhance" a retailer's in-house database of current customers with additional data. For example, a retailer may want to know the age and marital status of all of the customers on its catalog mailing list. Using such demographic data, retailers can draw conclusions about the type of individuals or businesses that typically use their goods or services and can thus tailor a marketing strategy specifically to individuals or businesses meeting those criteria.

Retailers are not the only consumers of these types of data services. For example, insurance companies may require access to large compilations of such data for underwriting purposes. Credit card issuers also can benefit from compilations of this data in assessing risk and other factors impacting their business. Because of the broad spectrum of entities that may benefit from the extraction of such data, they will be referred to generically as "data customers."

Using prior art methods, the process of database enhancement for such purposes as described above is time consuming and labor intensive. In a typical example of the process, the data customer is first required to build an "extract file" containing an entry for each record in the data customer's database. This extract file is stored on a computer-readable medium, such as magnetic tape, which is then shipped to the data vendor for enhancement.

Since a wide variety of database formats may be used by different data customers, the data vendor must first convert the extract file to the data vendor's internal format for processing. Using this standardized version of the extract file, the data vendor then executes a software application that compares the information in the data customer's database against all of the information that the data vendor maintains or has access to in its various databases. The requested information is typically spread over a number of physically remote databases, which must be individually searched by the data vendor. The data vendor's personnel must create specialized software applications that access each of these physically remote databases to search for the desired data. Additional software is required to compile the data in a central location and "purge" duplicate entries.

The enhancement data is then overlaid onto the data customer's standardized extract file. The resulting file is reformatted into the data customer's database format and written back onto the computer-readable medium for shipment back to the data customer. This process thus requires significant direct involvement by the data vendor's personnel and can in some cases require several weeks from start to finish.

A significant limitation of the current industry method is that each time enhancement data is requested, the entire process must be repeated. Although matching keys are created during the comparison process to match each structure in the data customer's database with the equivalent structure in the data vendor's databases, those keys are temporary and are lost once the process is complete. The keys must be recreated from scratch each time an enhancement task is run, even when the data customer only wants to update existing data. It would be impossible to reuse these keys since they are not unique across all of the data vendor's databases.

A further limitation of the current method is that enhancement data must be pulled from numerous sources using a process that is unique for each physical database accessed. Data vendors do not typically maintain all of the data that they use in one physical database. Instead, the data is spread across many databases, often at remote locations. Thus to enhance a data customer's database, a program must be created that pulls each element of the requested data from the particular remote database where it is located. Each of these databases may reside on a different type of computer, may run on a different operating system, and may store information using a different database software product. The creation of specialized programs to access each of these individual remote databases to find the particular information desired by the data customer consumes the time and energy of data vendor personnel each time a new data enhancement request is submitted.

Another limitation of the current method for database enhancement is that the entire process must be performed when the data customer only requires an update to information already contained in its database. For example, a retailer may desire to update the addresses in its customer database once per month. Most such customers will not have changed their address within this period. However, the current method would require the retailer to order an entirely new set of data that replaces the old set, since there is no means to keep track of which addresses have changed since the retailer's last data update.

Yet another limitation of the current method is that it does not provide the option of near real-time data access. The system is inherently batch mode in operation, since the data for which update or enhancement is required is shipped to the data vendor, who then returns the modified data some time later. There is no means by which a data customer can remotely and automatically establish a linkage between its database and a data vendor's databases so that update or enhancement data can be immediately overlaid onto the data customer's database.

Still another limitation of the current method is the high transactional cost incurred in any update or enhancement, no matter how much data is transferred. The cost of updating or enhancing data reflects the cost both of compiling and maintaining the requested data and of performing the update or enhancement operation itself. Since the cost of the update or enhancement operation is virtually the same no matter how much data is requested, small retailers and other similarly-situated data customers with relatively small databases (say, for example, fewer than 100,000 records) have historically been precluded from the market for data vendors' services. The high transactional costs are incurred because of the extensive human interaction required using the current method for the update or enhancement of any data. The current update and enhancement method is not sufficiently automated to push the associated transaction costs low enough for many smaller entities to afford such services.

SUMMARY OF THE INVENTION

The present invention is directed to a method and system by which persistent keys facilitate the enhancement and update of a data customer's database. These persistent keys are permanently linked to the same particular record on the data vendor's central database. Once these keys are copied onto the data customer's database, the keys may be used to compare equivalent data structures across the two databases. This comparison can be done in a batch mode by sending the list of persistent keys on one database to the other database, or may be done in near real time by joining the databases with links between matching persistent keys. The persistent keys also facilitate the data vendor's linkage of several physically remote databases into a single central database, since the data vendor may maintain only a part or none of its central database physically at its site. As a result of this linkage, the central database appears to the data customer to be a single source of information.

The present invention's improvements over the prior art are made possible by the use of the persistent keys. Each persistent key uniquely identifies a particular data structure. Such a data structure may represent, for example, all the information known about a particular individual, a business, an address, a piece of real property, or a vehicle. When a data structure representing such an entity is stored both in the data vendor's central database and on a data customer's customer database, the persistent keys linked to each of these data structures will match. This matching feature allows comparison of the equivalent data structures for efficient update or enhancement of data on the data customer's database.

The persistent keys are divided into several fields of information, including an entity code, a randomly-assigned unique number, and a version number. The entity code denotes the type of entity which the associated data structure represents. For example, one entity code may indicate that the data structure contains information on an individual and another may mean that the data structure represents a business.

The unique number is simply a randomly-assigned number to ensure that each persistent key is distinguishable from all other persistent keys. A fundamental requirement of the disclosed invention is that each persistent key must be unique across the entire central database. Thus if two matching persistent keys are found, it may be assumed that these keys are linked to records with matching (but not necessarily identical) data. However, the same unique number can be assigned to data structures representing different entities with related information. For example, the same unique number can be assigned to an individual and to the address for that individual. The different entity code ensures that the overall persistent key for each data structure is unique. The reuse of the same unique number for data structures with different entity codes allows, for example, the matching of an individual to that individual's vehicle using the persistent keys.

The version number in each persistent key is incremented each time any field in the record linked to that persistent key is changed. To ensure data coherency, the version number can only be changed by the data vendor's central database manager, and not by the physically remote databases that may actually contain the requested data. By comparing version numbers between otherwise-similar persistent keys, a data vendor can determine which data structures in a data customer's database have changed since the data customer's last data update. Thus only the data that has actually changed need be sent to the data customer.

A typical example of the disclosed process for data enhancement using persistent keys begins with the delivery to the data customer of a computer-readable medium containing the entire set of all persistent keys matched with a key field from the record associated with that persistent key. For example, a retailer with a database of preferred customers may receive a list of persistent keys matched with the "last name" field from the records linked to those persistent keys. This list will include a persistent key and last name for every relevant data structure in the data vendor's central database. The delivery medium may be, for example, a single DVD-ROM or a set of CD-ROMs.

The computer-readable medium also contains a software program that, when executed on the data customer's computer, matches the records in the data customer's database with the matching key field on the computer-readable medium. During this matching operation, the associated persistent key for each matched key field is copied onto the data customer's database and linked to the matched record. Returning to the above example, the retailer's database would now have a persistent key matched to each preferred customer record. Due to the matching quality of the persistent keys, the keys may be formulated into a list and used to request information pertaining to only the retailer's customers without requiring a search of the data vendor's entire central database. Since each persistent key uniquely identifies a particular record on the central database, the data customer need only send the keys to request any update or enhancement. Alternatively, the persistent keys can be used to directly join the data customer's database with that of the data vendor for near real-time data update and enhancement.

The initial key field matching process need only be performed once for any data customer's database. Since the persistent keys are by definition permanently associated with a single entity (for example, an individual, address, or business), the data customer need never regenerate the persistent keys. Whenever a future update or enhancement is desired, the same persistent keys may be reused to request that data.

Once the persistent keys are incorporated into the data customer's database, two methods may be used to request update or enhancement data. Using the first method, the update or enhancement request is processed in batch mode by the central database manager. The data customer need only supply the data vendor with a form indicating what data is requested along with the data customer's list of persistent keys. Since the persistent keys are matched to a unique data structure in the data vendor's central database, no data need be sent to perform the matching operation; this eliminates the need for the large extract file required under the previous method. Because of its relatively small size, this list of persistent keys can be quickly sent via a computer communications network such as the Internet; however, any other method of transmitting digital data may also be used, such as direct satellite links, secured transmission lines, or even physical transfer of magnetic, magneto-optical, or optical storage media. Sending only the persistent keys to the data vendor, rather than all of the underlying data, is a significant security advantage as well, since anyone who intercepts the list cannot extrapolate the underlying data from just a list of persistent keys.

Along with the generated list of persistent keys, the data customer will also submit a form indicating the type of enhancement data required. Using the form, the data provided to each data customer can be specifically tailored to that data customer's needs. For example, a retailer with a list of customer names may want phone numbers for each of those customers, but does not need-and therefore does not wish to pay for—complex demographic data. As another example, a car insurance company might request only updated driving records for all of its insureds.

Once the list of persistent keys and the form is received, the data vendor may compile the requested information. Each persistent key in the list is matched to the record on the central database that is linked to the equivalent key. The persistent keys function as an index that allows each relevant record on the central database to be quickly located. This process is automatically performed by software executing on the data vendor's computer system, and thus requires no direct intervention by data vendor personnel. Since the persistent keys are permanently linked to each data structure in the central database, the process of generating temporary keys for each update or enhancement request is eliminated.

Once the requested data is assembled, it can be sent back to the data customer, preferably via the Internet, but it can also be sent by any other method by which digital information may be transferred. The information is sent back with its linked persistent key to allow the retailer to integrate the enhancement or update data with its current data by matching equivalent persistent keys.

As an alternative to batch-mode operation, the data vendor may establish a direct table join between the data vendor's database and the data customer's database. This table join would preferably be performed via a global communications network such as the Internet, but any other method of direct communication could be used as well. Using a direct table join, the requirement of sending a separate list of keys to the data vendor is eliminated. Once the data vendor receives the completed form from the data customer, it can transfer the requested update or enhancement data directly into the data customer's database along the table joins.

A significant advantage of this alternative method is that the transfer takes place in near real time. Depending upon the volume of data required, the data customer using this method may receive the requested data within minutes of making the request. Because of the near real-time nature of this operation, this method is best used for smaller databases or when the update or enhancement operation will not require the transfer of an extremely large amount of data. For example, a catalog retailer that wishes to update the addresses for customers on its mailing list weekly would likely prefer this method, since only a small percentage of its customers' addresses will change each week. The high transaction costs of previous methods for updating a mailing list would have made this type of frequent updating cost prohibitive.

The persistent keys also facilitate the linkage of the various physical databases that form the central database. Data for related entities may be stored in numerous remote locations, requiring the central database manager to look in several locations to find all of the information requested by the retailer. The central database manager uses the persistent keys to link this information together across physically remote databases, so that it appears to any application requesting this information that all of the data resides at a central location. In this way, a virtual central database is created using the persistent keys. The virtual central database eliminates the need to create new software applications to access each physical database separately for each data customer request; instead, the same central software is used again and again without regard to the information that is requested or which physical database must be accessed.

While many data customers have a database for which they require update or enhancement data, others may have no database of their own or may wish to construct a new one. For example, a retailer may wish to perform a mass-mailing to potential new customers that are defined by certain parameters, such as age and marital status. It is currently common for retailers who perform such mass mailings to maintain no database of their own and instead rely on data vendors to generate the mailing list and even print the mailing labels for catalogs or other advertisements. Because of the high transaction cost of even a simple update using the current method, there has historically been little incentive for such data customers to maintain their own database.

Using the present invention, data customers without a starting database submit a form to the data vendor describing the parameters for the database they would like to build. This form is similar to that described above for update or enhancement requests. When the requested data is returned to the data customer for inclusion in a new database, each record will be linked to the persistent key associated with that record on the central database. In this way, later requests by the data customer to update or enhance this data may be performed automatically without the need to perform the preliminary matching process. Because of the reduced transaction costs for updates using the disclosed method, many data customers that historically did not maintain their own database will find it economically advantageous to do so.

Once a data customer has a database containing the desired data, periodic updates will be simplified by use of the persistent keys. As noted above, one element of each persistent key is a version number, which is maintained and updated by the data vendor's central database manager. Each time any data element in the record associated with a persistent key is changed, the version number within the persistent key is incremented on the central database. For example, a record representing an individual may be updated by a new address for that individual, resulting in the increment of the version number of the persistent key linked to that record. At this point, all data customers who maintain information on this individual will have a different (older) version number in the persistent key linked to this record on their databases.

A data customer's database update request will include the list of persistent keys that correspond to each record in the data customer's database. Once the request is received, the version number in those persistent keys will be compared to the version number in the equivalent persistent key maintained on the central database. Only if the version number for a particular record has changed will any new data be sent to the data customer. Thus only that portion of the data that has actually changed since the data customer's last update need be sent.

The persistent keys also facilitate a data customer's request for additional data to complement that already received. For example, suppose a retailer wants a database of names and addresses of potential customers according to certain criteria, and wants that list updated semi-annually. The first such list would be built as described above. However the data customer does not need an entirely new list sent every six months; instead, the data customer only needs to be sent any data that it does not already have. By sending its list of persistent keys with the request for new data, the data customer can indicate to the central database manager which data it already has (and therefore does not need). The central database manager can formulate the response to this request as described above, but eliminate any data transfers pertaining to records linked to those persistent keys sent by the data customer, thereby making the subsequent updates quicker and more efficient.

The persistent keys also support business intelligence and analysis applications by allowing third-party OLAP applications to build a multi-dimensional database for analysis of the combined data of the customer database and the central database. OLAP (On-Line Analytical Processing) applications, in contrast to the traditional OLTP (On-Line Transaction Processing) applications, are designed to access multidimensional databases rather than simple relational databases. A third-party OLAP application can use the persistent keys to link the customer database and central database, forming a multidimensional database. Such databases are optimized to allow viewing of large aggregates of data for purposes of summary and analysis, rather than the record-by-record access used for relational databases. One example of a commercially developed multidimensional database is Arbor's Essbase. By building a multidimensional database using data from both the customer and central databases, the information can be combined and used for business analysis, trend spotting, and forecasting. OLAP technology allows the summarization of such data in near real-time so that problems requiring the analysis of large aggregates of data can be quickly and easily solved, without individualized calls to each record in a large database. For example, an OLAP application as described might be used to determine in near real time whether couples without children eat at certain restaurants more often than couples with children, or which make and model of car is preferred by retirees.

As demonstrated by the foregoing discussion, it is an object of the present invention to assign a unique persistent key to each entity represented by a record in a data vendor's central database.

It is a further object of the present invention to use persistent keys to allow remote access to enhanced data for a data customer's database.

It is a further object of the present invention to allow the linkage of associated records using the unique number and entity code of the associated persistent keys.

It is a further object of the present invention to use persistent keys to transparently link a plurality of physically remote databases to form a unified central database from which to retrieve enhanced data.

It is a further object of the present invention to use the version number of the persistent keys to provide efficient periodic updates of a data customer's database via remote access to a data vendor's central database.

It is a further object of the present invention to allow update and enhancement data to be sent to a data customer either through a batch-mode operation or through direct table joins between the data customer's database and the data vendor's central database.

It is a further object of the present invention to lower the fixed transactional cost associated with a data update or enhancement request by reducing the required human interaction in processing such a request and reducing the amount of data that must be transferred in response to such a request.

Further objects and advantages of the present invention will be apparent from a consideration of the following detailed description of the preferred embodiments in conjunction with the appended drawings as briefly described following.

BRIEF DESCRIPTION OF THE DRAWINGS

FIG. 6 illustrates the contents of the DVD-ROM delivered to data customers wishing to update or enhance their database for the first time.

DETAILED DESCRIPTION OF THE PREFERRED EMBODIMENTS

Figure 2:
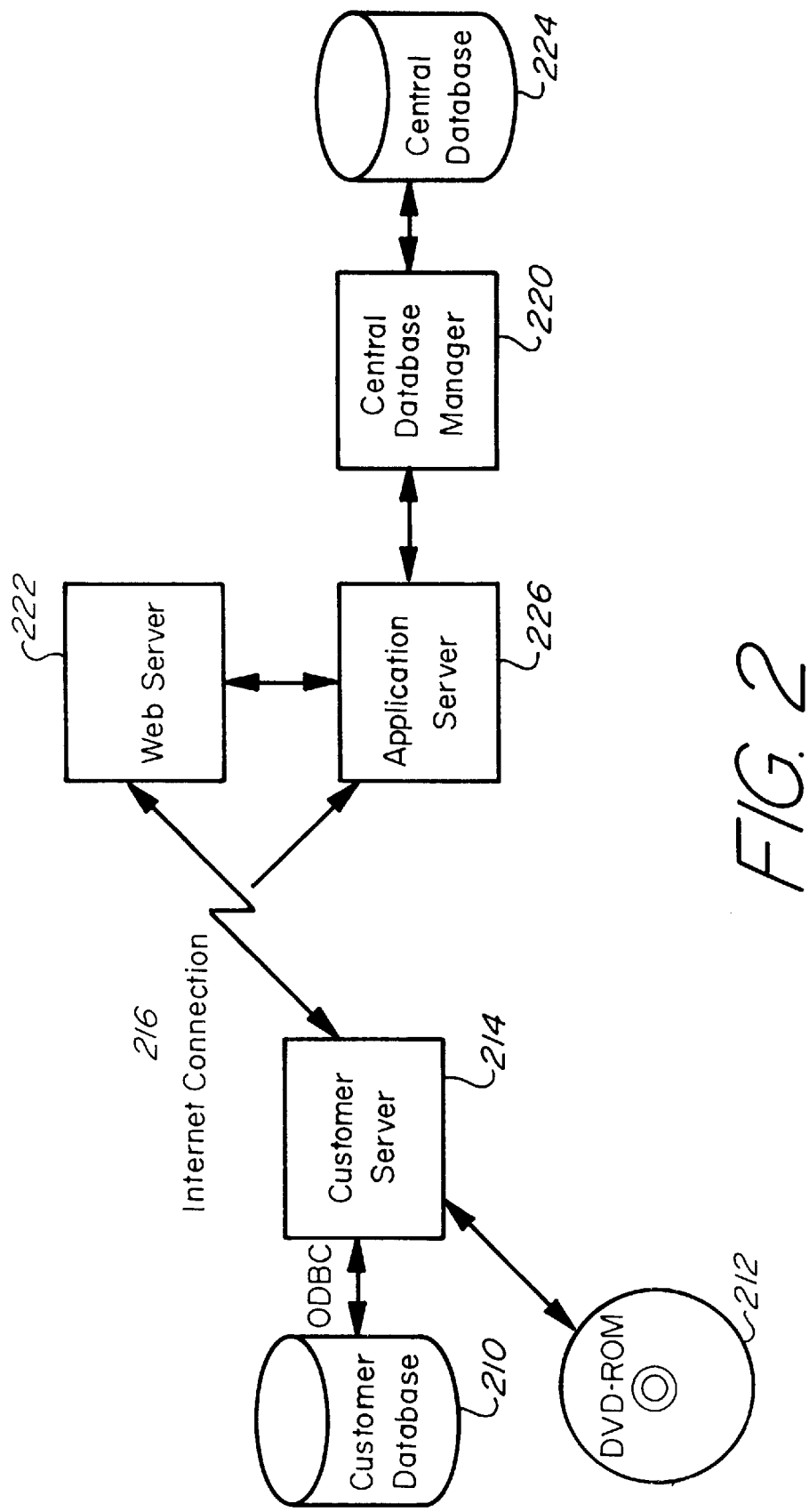
FIG. 2 is a structural diagram illustrating the major components in the disclosed system.

Referring to FIG. 2, a high-level structural diagram of a preferred embodiment of the present invention is shown. The data customer maintains its own database, customer database 210, in which to store data pertaining to its customers, insureds, or other entities for which the data customer requires information. As will be discussed, the data customer can begin the process with data already resident on customer database 210 (if an update or enhancement of data is required) or can request new data to be stored on customer database 210.

In a preferred embodiment of the invention, the customer database 210 is ODBC-compliant. ODBC ("Open Database Connectivity") is a database interface protocol developed by Microsoft™ Corporation that is now supported by all major database product vendors. ODBC enables an ODBC-compliant application program to submit the same query to any ODBC-compliant database without regard to the particular database product on which the desired data is stored. This is important since every database product provider uses a different format for its database; without ODBC, a different query would be required for each database product on the market. ODBC is implemented by a driver that "translates" SQL (Standard Query Language) data queries from the application software into requests that the queried database can process. ODBC drivers are well known in the prior art and are available from several software publishers, including Simba Technology.

Central database 224 contains the master list of all data records from which new databases may be built or from which enhancement or update data may be requested. In a preferred embodiment, central database 224 comprises a series of physically remote databases communicatively linked together. Central database manager 220 manages access to the various databases such that central database 224 appears to be a single source of information. Thus central database 224 can be characterized as a "virtual" central database.

In a preferred embodiment, central database 224 is ODBC-compliant. If both customer database 210 and central database 224 are ODBC-compliant, then application software may be used to "link" the databases regardless of the different formats in which data is stored on the respective databases. As will be described more fully below, this linkage allows the direct overlay of data from central database 224 onto data on customer database 210. Application server 226 facilitates this direct linkage between the two databases as described below.

The customer server 214 is communicatively connected with the application server 226 via Internet connection 216. Using Internet connection 216, a software application executing on customer server 214 can directly connect the ODBC-compliant customer database 210 and central database 224. This direct table join between the two databases allows the direct transfer of update or enhancement data into customer database 210.

Customer server 214 is also communicatively connected with web server 222, via Internet connection 216. Internet connection 216 allows the customer server to submit forms and to transmit and receive data in batch mode from central database 224. Internet connection 216 uses the HTTP (Hypertext Transfer Protocol) communications protocol, which is well known in the prior art and is the standard communications protocol on the World Wide Web. The user interface for web server 222 may be coded using HTML (Hypertext Markup Language), the language typically used to construct "web pages" resident on the World Wide Web.

Web server 222 and application server 226 communicate along a closed high-speed digital T1 interconnect as is well known in the prior art. This connection provides the ability to pass data requests from the customer server 214 to the central database manager 220, and to pass data from central database 224 to customer database 210.

DVD-ROM 212 is a part of the system only when the data customer has data stored in customer database 210 prior to its first use of the system. DVD (Digital Versatile Disk) is an optical disk storage technology that provides a storage capacity equal to several CD-ROM disks. The DVD format is preferred because a single DVD-ROM disk can store the entire list of all persistent keys with an associated key field.

As will be described more fully below, DVD-ROM 212 contains the data, persistent keys, and application software necessary to facilitate the initial update and enhancement of customer database 210 using central database 224.

Figure 1:
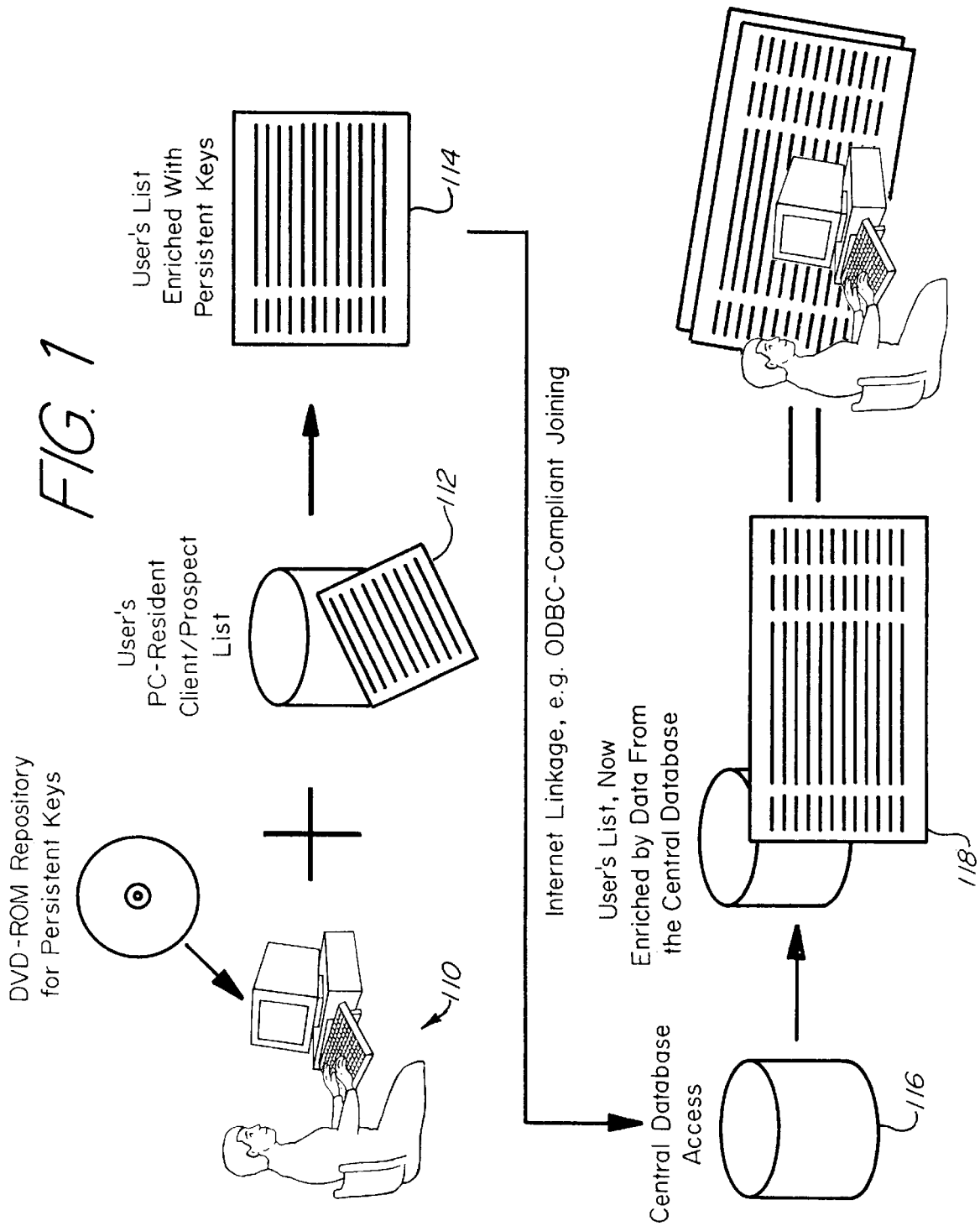
FIG. 1 is a process flow diagram illustrating the major steps in the disclosed method.

Referring now to FIG. 1, an overview of the process for data update or enhancement is described. As discussed previously, the steps required in this process depend on whether the data customer begins with initial data in customer database 210, and thus whether new data or a mere update or enhancement is required. The process will first be described for the case of an update or enhancement of existing data.

Prior to a data customer's first access to central database 224, the data vendor ships to the data customer DVD-ROM 212, as shown in step 110. FIG. 6 illustrates the contents of DVD-ROM 212. This information consists of a key field 612 from each record on central database 224, as well as the persistent key 610 associated with each of those records. Key field 612 is chosen as that field from each record that can be easily used to match the record on customer database 210 that contains complementary information. For example, if central database 224 maintains a record with all known information on individual John Doe, the key field 612 from that record might be the last name field, "Doe." If the record in question contains information on a vehicle, the VIN (Vehicle Identification Number) may be the key field 612.

Also stored on DVD-ROM 212 is key field matching application 614. Matching application 614 is a computer program executable on customer server 214 that is operable to iteratively match the appropriate field in each record on customer database 210 to key field 612. For each record on customer database 210, the application program compares the field with information corresponding to each of key fields 612 until a match is found. As each record is matched to the corresponding key field 612, matching application 614 copies the persistent key 610 linked to that key field 612 onto customer database 210 and links that persistent key to the matched record. In this way, all of the records on customer database 210 are enhanced with the corresponding persistent key from central database 224. For example, suppose data customer 214 is a retailer with a list of retail customers, the first record of which is a record for customer John Doe. Matching application 614 will compare each key field 612 on DVD-ROM 212 to the last name field of the record for John Doe until a match is found. Then matching application 614 will copy the persistent key linked to that key field 612 onto the retailer's customer database 224 and link it to the record for retail customer John Doe. The process thus transforms the data customer's records, as shown in step 112 of FIG. 1, into the same records with the appropriate linked persistent key as shown in step 114. The customer database 210 is now "enriched" with the matched persistent keys 610.

Figures 4, 5:
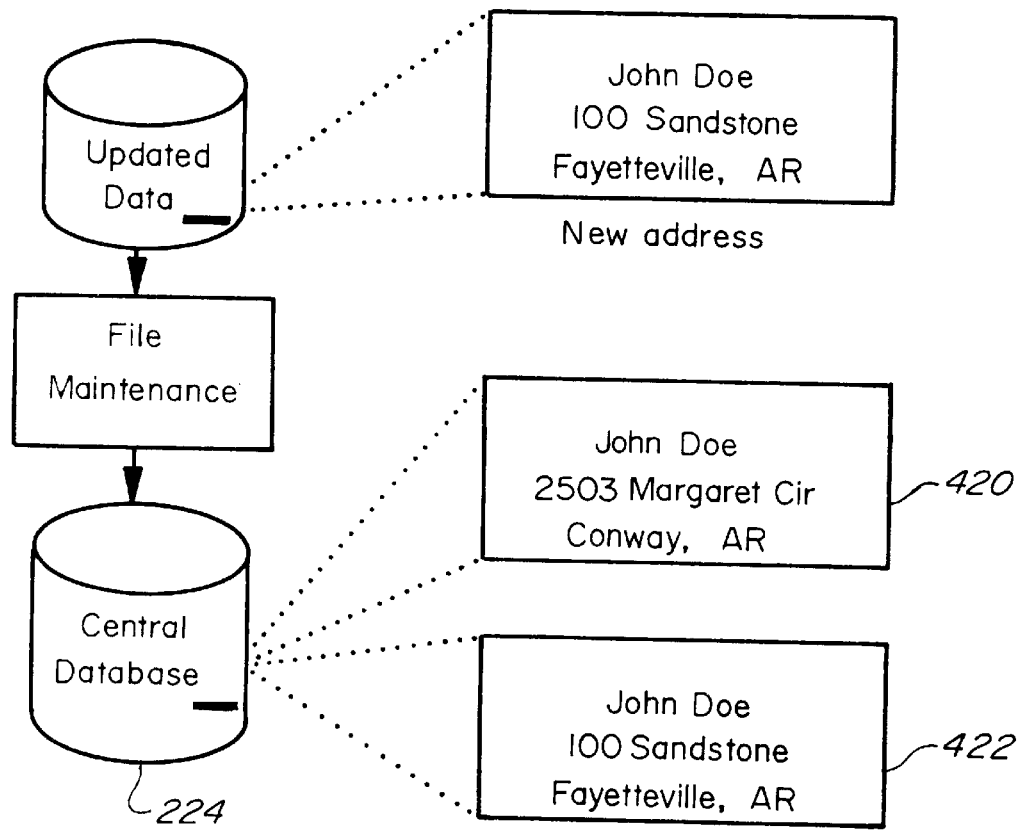
FIG. 4 is a process flow diagram illustrating the modification of the version number in the persistent keys as part of the disclosed method.
FIG. 5 is a structural diagram illustrating the fields in each of the persistent keys.

Persistent key 610 is divided into a series of fields, as shown in FIG. 5. The country code 510 is a one-byte field that indicates which country the entity represented by the data in the related record (whether individual, business, or address) pertains to. This information is important since large databases used to compile mailing lists and other similar functions have historically been divided according to the country of origin of the information. Thus, for example, a "1" may represent an entity from the United States, and a "2" may represent an entity from Canada.

The entity code 512 is used to indicate the type of entity that the data in the related record represents. Entity code 512 is also a one-byte field. For example, an entity code of "1"

may indicate that the record pertains to an individual, a "2" may indicate that the record pertains to an address, and a "3" may indicate that the record pertains to a vehicle.

The unique number 514 is a randomly assigned number that must be unique among the set of persistent keys 610 that share that same entity code 512 and country code 510. The unique number uses a four-byte field, and thus the range of possible unique numbers 514 for each entity code 512 is from 0 to 4,294,967,295. The unique number may be assigned in any manner in which unique random numbers are generated, preferably by simply assigning each number in sequence as data is added to central database 224. Central database manager 220 is solely responsible for assigning all new unique numbers 514.

Version number 516 is used to indicate whether data stored in the record associated with the persistent key 610 has changed since the data customer's last update request. Version number 516 uses a one-byte field, and thus the range of possible version numbers is from 0 to 255. Each time data in the record associated with a persistent key 610 is changed, central database manager 220 increments the version number 516 for that persistent key 610. Thus if the version number 516 for a particular persistent key 610 is 0, and a change (such as a new address) is performed to data in that record, the version number 516 of that persistent key 610 will be incremented to 1. When the version number 516 is incremented past 255, it resets to zero.

FIG. 4 illustrates an example of incrementing the version number 516. Original persistent key 420 is linked to a record with the data shown above that key for individual John Doe. If John Doe moves and central database 224 captures information indicating the change of address, the version number may be incremented from 1 to 2 to indicate that a change has occurred, resulting in modified persistent key 422. If a data customer's customer database 210 has an older version of the record, the related persistent key will have the version number still set to 1. By comparing the persistent key from the customer database 210 with the persistent key maintained on the central database 224, the central database manager 220 can immediately determine if update data is required for this record. If the persistent keys had identical version numbers, there would be no need to send any data from that record in response to a data update request.

Check digit 518 is used to ensure that each persistent key received by the central database manager 220 as part of an enhancement or update request has not been altered. The check digit may be any value from 0 to 9. To check that no alteration of the persistent key has occurred, central database manager 220 executes an algorithm with unique number 514 as input. For each unique number 514, the algorithm is written so as to produce the matching check digit 518 for that unique number. If the algorithm indicates that the check digit 518 in the persistent key does not match the unique number 514, the persistent key is not processed and an error is reported by central database manager 220. The check digit 518 thus performs an error-checking function by preventing improperly transmitted persistent keys from being processed, as well as a security function by ensuring that only users presenting persistent keys originating from central database manager 220 are allowed access to the central database 224.

Once customer database 210 is enriched with persistent keys 610 as shown in step 114, the data customer may now request update or enhancement of customer database 210. If the data customer is a first-time user, the data customer uses customer server 214 to access web server 222 via Internet connection 216. Once communication is established with web server 222, the data customer fills in required forms presented to customer server 214 from web server 222. The data customer is also required to establish an account and indicate a method of payment for subsequent data purchases. Secure payment systems for goods or services sold over the Internet are well known in the prior art; such a system known as Open Market may be used with the disclosed invention. After the data customer is registered and has established an active account, the data customer uses customer server 214 to access application server 221 via Internet connection 216. Once in communication with the application server 221, the customer may submit information that describes the requested update or enhancement data. This information is supplied in the form of a SQL query or series of SQL queries.

The data customer may receive the update or enhancement data in batch-mode form or in near real-time mode through a direct table join. The decision is largely dictated by the data update or enhancement request itself. For example, an enhancement request for a single record can be most efficiently performed in near real-time mode. However, an enhancement request for millions of records is more efficiently performed in batch mode.

If the customer chooses to update data in batch mode, then the client application server first sends the list of those persistent keys 610 maintained on the customer database 210, each of which correspond to one record on customer database 210, to web server 222 via the Internet connection 216. These keys are then transmitted to application server 226 and passed to central database manager 220. For each persistent key 610 in the list, central database manager 220 matches that key to the equivalent (but not necessarily identical) persistent key 610 maintained on central database 224. As described earlier, central database 224 is actually composed of a plurality of physically remote databases that maintain different types of information on the same or similar entities. However, each of the physically remote databases maintain a copy of the appropriate persistent key 610 on that database linked to the corresponding record. For example, suppose central database manager 220 receives a request for enhancement data pertaining to individual John Doe. Physical database A may have a record with John Doe's address and phone number, physical database B may have a record with John Doe's age, income, and marital status, and physical database C may have a record with data pertaining to John Doe's purchasing habits. Depending upon which type of enhancement data is required, central database manager 220 may need to access all of these physical databases to find all of the required data. For each physical database, central database manager 220 uses the persistent keys as an index to look for the record containing the requested data. Central database manager 220 can compile any of this information and return it to customer server 214 for inclusion in customer database 210 if an enhancement request was made. In the case of an update request, the version number of the persistent key from customer database 210 is compared to the version number of the matching persistent key maintained by central database manager 220; only if the numbers do not match will new data be sent back to the customer database 210.

If a data customer chooses to update data in near real-time mode, the customer server 214 and application server 226 are used to form a direct link, or table join, between the customer database 210 and central database 324 through Internet connection 216. The direct table join is formed by the matching of records having equivalent persistent keys.

This ability to access the desired data immediately after the request is made is referred to as near real-time operation.

Figure 3:
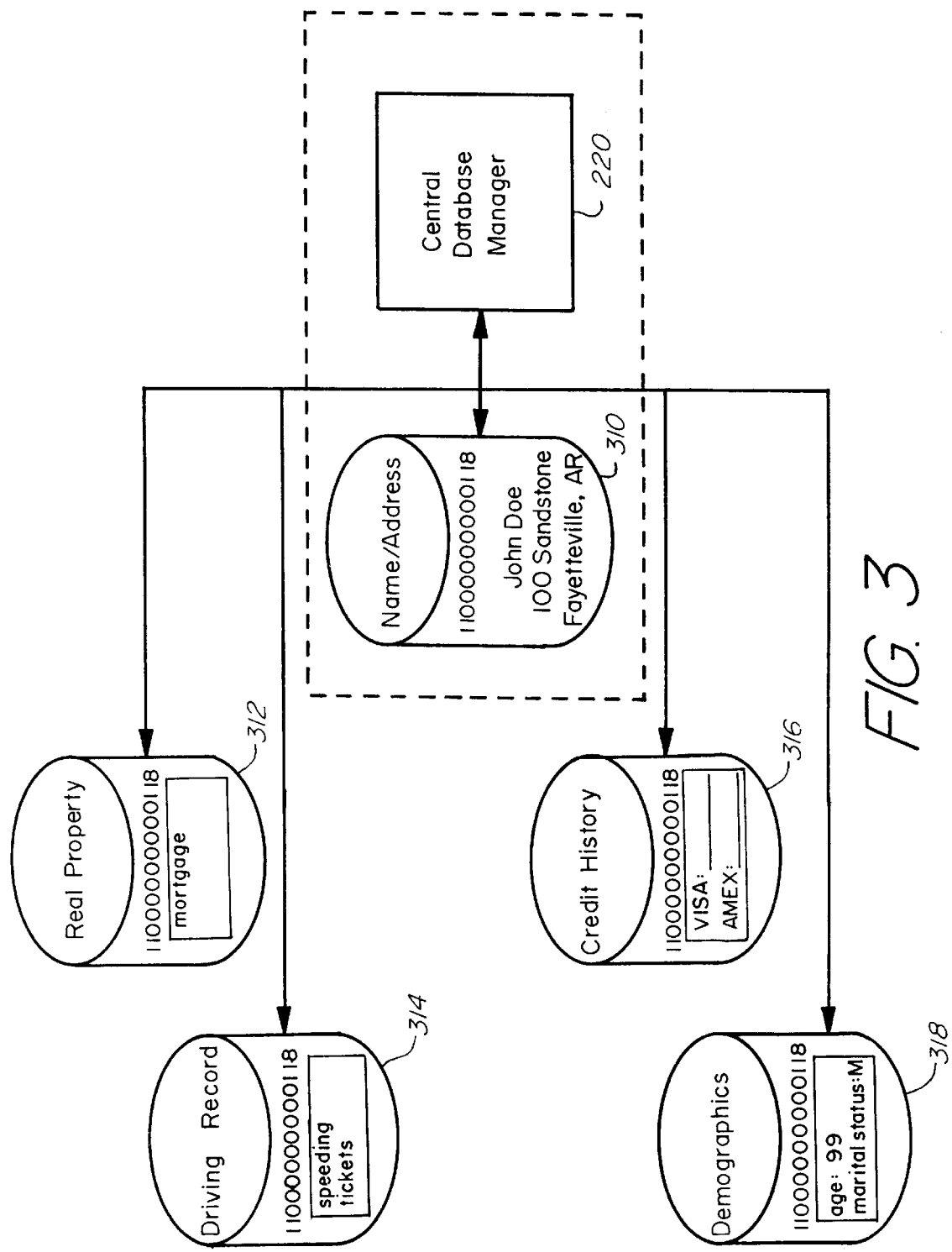
FIG. 3 is a structural diagram illustrating a series of physically remote databases managed by the central database manager.

The central database 224 appears from the perspective of the customer server 214 to be a single database. However, in a preferred embodiment, central database 224 is actually a series of physically remote databases managed by central database manager 220, as shown in FIG. 3. Central database manager 220 creates the "illusion" of a united central database 224 by the manner in which it controls data flow to and from central database 224. For example, the data vendor may maintain current names and addresses on a local database 310, real property records on a physically remote database 312, driving records on a second remote database 314, credit information on a third remote database 316, and demographic information on a fourth remote database 318. For each data element on these physically separate databases that pertains to the same entity, the persistent keys linked to each data element will be the same. The central database manager can thus use the persistent keys to link this information together across physically remote databases, so that it appears to any application requesting this information that all of the data resides at a central location.

In near real-time mode, central database manager uses the persistent keys associated with each record to link together associated data from different physical databases so that the combined data can be linked to the equivalent record in the customer database 210. When central database manager 220 receives an update request for a "virtual" record on central database 224, it uses these links to search for and compile the data in the virtual record by accessing the information in all of the linked records from the various physically remote databases. It returns update information, if necessary, in a unit so that it appears that central database manager 220 accessed a single unified record.

What is claimed is:

1. A system for the creation, enhancement, and update of data resident at a remote location using data logically resident at a central location comprising:
   (a) a central database;
   (b) a customer database;
   (c) a bi-directional transfer means communicatively connecting said central database and said customer database;
   (d) a plurality of records resident on said central database and said customer database, each of said records comprising a plurality of fields, and each of said records that is resident on said customer database being matchable to one of said records that is resident on said central database;
   (e) a plurality of persistent keys resident on said central database, the value of each of said persistent keys being independent of the physical storage location of said central records, the number of said persistent keys being equal to the number of said central records, each one of said persistent keys being linked to one of said central records, and each one of said persistent keys being permanent and distinguishable from every other one of said persistent keys.

2. A system according to claim 1, further comprising a computer-readable storage medium comprising:
   (a) a persistent key list;
   (b) a key field list comprising one field from each record resident on said central database; and
   (c) a matching application operable to match each record on said customer database to one key field of said key field list, and link one persistent key of said persistent key list to each matched record on said customer database.

3. A system according to claim 2, wherein said matching application comprises:
   (a) a first procedure that, for each record on said customer database, locates that field in each record that corresponds to the fields in said key field list;
   (b) a second procedure that iteratively compares the located field with each key field in said key field list until a match is found; and
   (c) a third procedure that creates on said customer database a copy of the persistent key from said persistent key list corresponding to the matched key field and links said copy with the matched record on said customer database.

4. A system according to claim 1, wherein each of said plurality of persistent keys comprises:
   (a) an entity code, said entity code denoting the type of data stored in that record on said central database linked to said persistent key comprising said entity code;
   (b) a unique number, said unique number distinguishing each of said persistent keys from every other one of said persistent keys;
   (c) a version number, said version number incrementable each time any of said fields of said record on said central database linked to said persistent key comprising said version number is modified; and
   (d) a check digit manipulable to check that said persistent key comprising said check code originated from said central database.

5. A system according to claim 4, wherein each of said plurality of persistent keys further comprises a country code, said country code denoting the country of origin for the data stored in that record on said central database linked to said persistent key comprising said country code.

6. A system according to claim 1, wherein said central database comprises:
   (a) a central database manager;
   (b) a plurality of linked physical databases; and
   (c) a plurality of partial records resident on said plurality of linked physical databases, said partial records combinable to form records resident on said central database, and the same one of said plurality of persistent keys being linked to each of said partial records that are combinable to form a single record resident on said central database.

7. A system according to claim 6, wherein said linked physical databases are linked by said plurality of persistent keys linked to each of said partial records resident on said plurality of linked physical databases.

8. A system according to claim 7, further comprising a customer server communicatively connected via said bi-directional transfer means between said customer database and said central database and operable to submit requests for at least one of update, enhancement, and new data to said central database.

9. A system according to claim 8, further comprising a web server that is communicatively connected via said bi-directional transfer means to said customer server and is operable to receive and process requests for at least one of update, enhancement, and new data from said customer server.

10. A system according to claim 9, further comprising an application server communicatively connected via said bi-directional transfer means between said customer server and said central database, and communicatively connected via said bi-directional transfer means to said web server, and operable to provide a direct interface between said central database and said customer database.

11. A system according to claim 8, wherein said central database manager comprises:
(a) a first batch-mode procedure whereby a persistent key of interest and a request for certain data associated with said persistent key of interest are received from said customer server;
(b) a second batch-mode procedure whereby said central database manager compares said persistent key of interest to the persistent key linked to each of said partial records to determine if each of said linked physical databases contains data associated with said persistent key of interest, and, if a match is found, returns said data from said partial record to said central database manager;
(c) a third batch-mode procedure whereby said central database manager compiles data from each of said matched partial records resident on said linked physical databases to form a full record linked to said persistent key of interest comprising said requested data; and
(d) a fourth batch-mode procedure whereby said central database manager compiles all said full records and sends that portion of said full records to said customer database that was the subject of said customer server request.

12. A system according to claim 11, wherein said second batch-mode procedure only returns said data from said partial record to said central database manager if said version number on said persistent key of interest does not match said version number on the persistent key linked to said partial record.

13. A system according to claim 8, wherein said central database manager comprises:
(a) a first near real-time mode procedure whereby a request for certain data is received from said customer server;
(b) a second near real-time mode procedure whereby said central database and said customer database are directly linked by means of a table join; and
(c) a third batch-mode procedure whereby said central database manager transmits data from each of said matched records in said central database to the corresponding record in said customer database along said table join if such data was requested by said customer server.

14. A system according to claim 13, wherein said third batch-mode procedure only transmits data along said table join if said version number on said persistent key for a particular matched record resident on said customer database does not match said version number on the persistent key linked to the matching said partial record.

15. A system according to claim 6, wherein said central database manager comprises means for allowing access to said central database as if said central database were a single physical database.

16. A system according to claim 6, wherein central database manager further comprises a means to increment said version number of that one of said persistent keys linked to a particular record resident on said central database when any field of said particular record is updated.

17. A system according to claim 1, wherein said bi-directional transfer means is a global computer communications network.

18. A system according to claim 1, wherein said bi-directional transfer means is a direct transmission line.

19. A system according to claim 1, further comprising a third-party server operable to access said customer database and said central database as an integrated multidimensional database via said bi-directional transfer means.

20. A system according to claim 19, wherein said third-party server uses matched persistent keys resident on said central database and said customer database to form said integrated multidimensional database.

21. A system according to claim 1, wherein each of said plurality of persistent keys comprises:
(a) an entity code, said entity code denoting the type of data stored in that record on said central database linked to said persistent key comprising said entity code; and
(b) a unique number, said unique number distinguishing each of said persistent keys from every other one of said persistent keys.

22. A system for the creation, enhancement and update of data stored at a remote location using data logically stored at a central location comprising:
(a) a central database comprising:
(i) a plurality of central records, each comprising a plurality of central record fields, and
(ii) a plurality of persistent keys, the value of each of said persistent keys being independent of the physical storage location of said central records, the number of said plurality of persistent keys and said plurality of central records being equal, each of said plurality of persistent keys linked to one of said plurality of central records, and being permanent and distinguishable from each other;
(b) a customer database comprising a plurality of customer records, each comprising a plurality of customer record fields, and each of said plurality of customer records being matchable to one of said plurality of central records; and
(c) a bi-directional transfer means communicatively connecting said central database and said customer database.

23. A system according to claim 22, further comprising a computer-readable storage medium comprising:
(a) a persistent key list;
(b) a key central record field list comprising one central record field from each central record; and
(c) a matching application operable to match each customer record to one key central record field of said key field list, and link one persistent key of said persistent key list to each matched customer record.

24. A system according to claim 23, wherein said matching application comprises:
(a) a first procedure that, for each customer record, locates that customer record field that corresponds to the key central record fields in said key central record field list;
(b) a second procedure that iteratively compares the located central record field with each key central record field in said key central record field list until a match is found; and
(c) a third procedure that creates on said customer database a copy of the persistent key from said persistent key list corresponding to the matched key central record field and links said copy with the matched customer record.

25. A system according to claim 22, wherein each of said persistent keys comprises:

(a) an entity code, said entity code denoting the type of data stored in that central record linked to said one of said persistent keys comprising said entity code;

(b) a unique number, said unique number distinguishing each of said persistent keys from every other one of said persistent keys;

(c) a version number, said version number incrementable each time any of said central data fields of that one of said central records linked to said persistent key comprising said version number is modified; and (d) a check digit manipulable to check that said persistent key comprising said check code originated from said central database.

26. A system according to claim 25, wherein each of said plurality of persistent keys further comprises a country code, said country code denoting the country of origin for the data stored in that record on said central database linked to said persistent key comprising said country code.

27. A system according to claim 22, wherein said central database comprises:

(a) a central database manager;

(b) a plurality of linked physical databases; and (c) a plurality of partial records resident on said plurality of linked physical databases, said partial records combinable to form central records, and the same one of said plurality of persistent keys being linked to each of said partial records that are combinable to form a single central record.

28. A system according to claim 21, wherein said linked physical databases are linked by said plurality of persistent keys linked to each of said partial records resident on said plurality of linked physical databases.

29. A system according to claim 28, further comprising a customer server communicatively connected via said bi-directional transfer means between said customer database and said central database and operable to submit requests for at least one of update, enhancement, and new data to said central database.

30. A system according to claim 29, further comprising a web server that is communicatively connected via said bi-directional transfer means to said customer server and is operable to receive and process requests for at least one of update, enhancement, and new data from said customer server.

31. A system according to claim 30, further comprising an application server communicatively connected via said bi-directional transfer means between said customer server and said central database, and communicatively connected via said bi-directional transfer means to said web server, and operable to provide a direct interface between said central database and said customer database.

32. A system according to claim 29, wherein said central database manager comprises:

(a) a first batch-mode procedure whereby a persistent key of interest and a request for certain data associated with said persistent key of interest are received from said customer server;

(b) a second batch-mode procedure whereby said central database manager compares said persistent key of interest to the persistent key linked to each of said partial records to determine if each of said linked physical databases contains data associated with said persistent key of interest, and, if a match is found, returns said data from said partial record to said central database manager;

(c) a third batch-mode procedure whereby said central database manager compiles data from each of said matched partial records resident on said linked physical databases to form a full record linked to said persistent key of interest comprising said requested data; and (d) a fourth batch-mode procedure whereby said central database manager compiles all said full records and sends that portion of said full records to said customer database that was the subject of said customer server request.

33. A system according to claim 32, wherein said second batch-mode procedure only returns said data from said partial record to said central database manager if said version number on said persistent key of interest does not match said version number on the persistent key linked to said partial record.

34. A system according to claim 29, wherein said central database manager comprises:

(a) a first near real-time mode procedure whereby a request for certain data is received from said customer server;

(b) a second near real-time mode procedure whereby said central database and said customer database are directly linked by means of a table join; and (c) a third batch-mode procedure whereby said central database manager transmits data from each of said matched records in said central database to the corresponding record in said customer database along said table join if such data was requested by said customer server.

35. A system according to claim 34, wherein said third batch-mode procedure only transmits data along said table join if said version number on said persistent key for a particular matched customer record resident on said customer database does not match said version number on the persistent key linked to the matching said partial record.

36. A system according to claim 28, wherein said central database manager comprises means for allowing access to said central database as if said central database were a single physical database.

37. A system according to claim 28, wherein said central database manager further comprises a means to increment said version number of that one of said persistent keys linked to a particular central record when any central record field comprising said particular central record is updated.

38. A system according to claim 22, wherein said bi-directional transfer means is a global computer communications network.

39. A system according to claim 22, wherein said bi-directional transfer means is a direct transmission line.

40. A system for the creation, enhancement, and update of data, comprising:

(a) a plurality of databases;

(b) a plurality of data structures resident on each of said plurality of databases, each of said plurality of data structures representing an entity; and (c) a plurality of persistent keys, each linked to one of said data structures stored on one of said plurality of databases, the value of each of said persistent keys being independent of the physical storage location of that one of said data structures to which said persistent key is linked, and each of said persistent keys being permanent and distinguishable from every other one of said persistent keys that is linked to one of said data structures that does not represent the same entity as that one of said data structures that is linked to that one of said persistent keys.

41. A system according to claim 40, wherein an updated version of each of said plurality of persistent keys is permanently maintained on one of said plurality of databases.

42. A plurality of persistent keys each linked to a data structure stored on a database, each of said plurality of persistent keys comprising:
- (a) an entity code, said entity code denoting the type of data stored in said data structure linked to said persistent key;
- (b) a unique number, said unique number distinguishing each of said plurality of persistent keys from every other one of said plurality of persistent keys that have an identical said entity code;
- (c) a version number, said version number incrementable each time said data stored in said data structure linked to said persistent key comprising said version number is modified; and
- (d) a check digit manipulable to check that said persistent key comprising said check code is authentic.

43. A system according to claim 42, wherein each of said plurality of persistent keys further comprises a country code, said country code denoting the country of origin for said data stored in said data structure linked to said persistent key comprising said country code.

44. A method for the creation, enhancement and update of data stored at a remote location using data logically stored at a central location comprising the steps of:
- (a) storing on a central database a plurality of records, each comprising a plurality of fields;
- (b) creating and linking to each said record a persistent key, each said persistent key being permanent and distinguishable from every other said persistent key, and the value of each of said persistent key being independent of the physical storage location of each said record;
- (c) copying each of said persistent keys and a key field found in said record linked to each said persistent key from said central database to a computer-readable medium;
- (d) interfacing said computer-readable medium with a customer database, said customer database comprising a plurality of said records;
- (e) for each record on said customer database, overlaying onto the record that one persistent key linked to said key field resident on said computer-readable medium whose data matches the corresponding field in said record on said customer database;
- (f) compiling a list of persistent keys resident on said customer database;
- (g) sending said list to said central database;
- (h) sending a data request to said central database, said data request specifying the type of update or enhancement required for said records on said customer database;
- (i) matching each persistent key of said list with the corresponding persistent key resident on said central database;
- (j) for each matched persistent key on said central database, retrieving the data requested from the record on said central database linked to each matched persistent key; and
- (k) compiling all data requested and sending the data to said customer database.

45. A method according to claim 44, wherein each persistent key comprises a version number, and step (j) is replaced with the step of, for each matched persistent key on said central database, retrieving the data requested from the record on said central database linked to each matched persistent key only if said version number of the matched persistent key on said central database is not identical to said version number of the matched persistent key from said list.

46. A method according to claim 44, wherein step (e) comprises the substeps of:
- (a) for each record on said customer database, iteratively comparing each key field stored on said computer-readable medium to the corresponding field of each record on said customer database until a match is found;
- (b) copying the persistent key stored on said computer-readable medium that is linked to the matched key field onto said customer database; and
- (c) linking the copied persistent key to the matched record on said customer database.

47. A method according to claim 44, wherein step (k) is accomplished by means of a direct table join between said customer database and said central database.

48. A method for the creation, enhancement and update of data stored at a remote location using data logically stored at a central location comprising the steps of:
- (a) storing on a central database a plurality of records, said records comprising a plurality of fields;
- (b) creating and linking to each said record a persistent key, each said persistent key being permanent and distinguishable from every other said persistent key, and the value of each of said persistent key being independent of the physical storage location of each said record;
- (c) sending a data request to said central database from a customer database, said data request specifying the type of said records required for inclusion on said customer database;
- (d) searching each said record on said central database for the data requested in said data request;
- (e) compiling all said records containing the data requested in said data request;
- (f) sending said compiled records to said customer database, along with that one of said persistent keys linked to each of said compiled records on said central database; and
- (g) storing said compiled records with said linked persistent keys on said customer database.

49. A method according to claim 48, wherein step (f) is accomplished by means of a direct table join between said customer database and said central database.

50. A method according to claim 44, wherein steps (i) and (j) comprise the substeps of:
- (aa) using a central database manager of which said central database is comprised, for each persistent key in said persistent key list sent by said customer database, polling each of a plurality of physically remote databases comprising said central database, each said physically remote database comprising partial records and a persistent key linked to each partial record, to determine if, for each said physically remote database, any of said partial records resident on said physically remote database are linked to a persistent key matching each of said list of persistent keys;
- (bb) for each said partial record so matched, compiling data in said partial record with data from every other partial record from other said physically remote databases that is also linked to a persistent key resident on that said physically remote database that also matches said one persistent key from said persistent key list; and (cc) creating from said compiled data a record on said central database that contains all said data from each of said matched partial records and is linked to said persistent key that was linked to each of said matched partial records.

51. A method for the creation, enhancement and update of data stored at a remote location using data logically stored at a central location comprising the steps of:

(a) storing on a central database a plurality of records, said records comprising a plurality of fields;

(b) creating and linking to each said record a persistent key, each said persistent key being permanent and distinguishable from every other said persistent key, and the value of each of said persistent key being independent of the physical storage location of each said record;

(c) copying each of said persistent keys and a key field found in said record linked to each said persistent key from said central database to a computer-readable medium;

(d) interfacing said computer-readable medium with a customer server, said customer server communicatively connected to a customer database, said customer database comprising a plurality of said records;

(e) using said customer server, for each record on said customer database, overlaying onto said record that one persistent key linked to said key field resident on said computer-readable medium whose data matches the corresponding field in said record on said customer database;

(f) using said customer server, compiling a list of said persistent keys resident on said customer database;

(g) sending said list of persistent keys from said customer server to an application server communicatively connected to said central database and said customer server;

(h) sending a data request from said customer server to a web server, said web server being communicatively connected to said application server and said customer server, said data request specifying the type of update or enhancement required for said records on said customer database;

(i) interpreting said data request using said web server, and passing said data request to said application server;

(j) using said application server, matching each of said list of persistent keys from said customer database with the corresponding said persistent key resident on said central database;

(k) using said application server, for each said matched persistent key on said central database, retrieving the data requested in said data request from the record on said central database linked to each said matched persistent key;

(l) compiling all said requested data and sending said compiled requested data from said application server to said customer server; and (m) using said customer server, integrating said requested data into said customer database.

52. A method according to claim 51, wherein all information sent between said customer database and said central database is sent via a global computer communications network.

53. A method according to claim 51, wherein all information sent between said customer database and said central database is sent via a direct transmission line.

54. A method for the analysis and summation of information stored at physically remote databases, comprising the steps of:

(a) using a bi-directional transfer means, establishing a connection between a third-party server and a central database, said central database comprising a plurality of records, each of said plurality of records on said central database being linked to a persistent key, each one of said persistent keys being permanent and distinguishable from all other said persistent keys resident on said central database, and the value of each of said persistent key being independent of the physical storage location of each said record;

(b) using said bi-directional transfer means, establishing a connection between said third-party server and a customer database, said customer database comprising a plurality of records, each of said plurality of records being linked to a persistent key, each of said persistent keys being matchable to a persistent key resident on said central database that is linked to a record that contains data related to that data in said record on said customer database to which that one of said persistent keys is linked; and (c) using said persistent keys resident on said central database and said customer database, matching said records linked to said persistent keys to form a single multidimensional database accessible by said third-party server.

55. A plurality of persistent keys each linked to a data structure stored on a database, wherein each of said plurality of persistent keys is permanent and distinguishable from all other said persistent keys, the value of each of said persistent keys is independent of the physical storage location of each said data structure, and each of said plurality of persistent keys comprising:

(a) an entity code, said entity code denoting the type of data stored in said data structure linked to said persistent key; and (b) a unique number, said unique number distinguishing each of said plurality of persistent keys from every other one of said plurality of persistent keys that have an identical entity code.

* * * * *